V. E. STRAYER & J. K. WEBBER.
SCREW-THREADING ATTACHMENT TO BEADING-MACHINES.
No. 182,491. Patented Sept. 19, 1876.
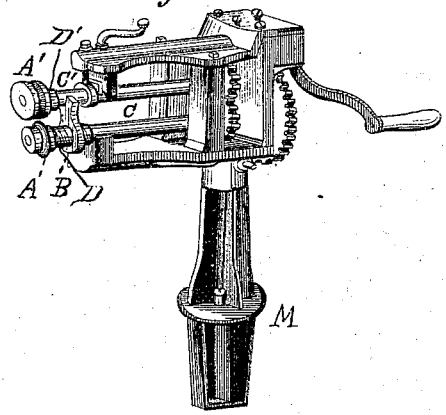
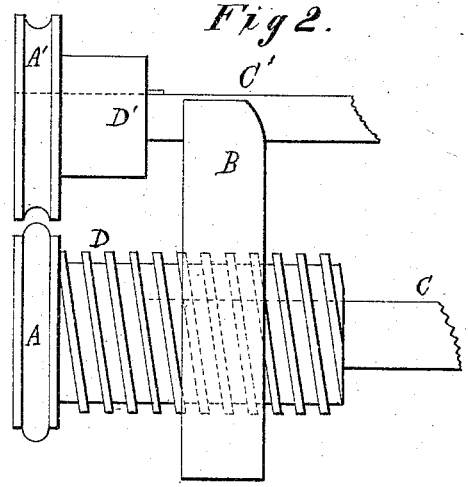
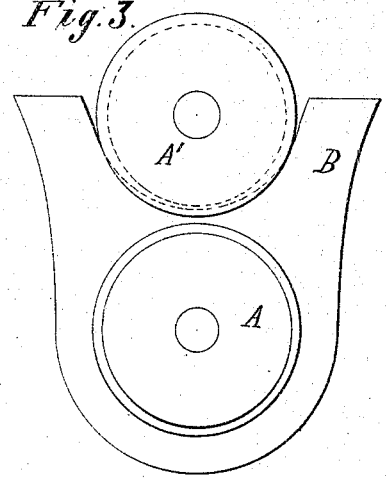
V. E. Strayer
and
J. K. Webber
INVENTORS.
WITNESSES:
J. McC. Perkin
ATTORNEY.

UNITED STATES PATENT OFFICE.

VALENTINE E. STRAYER AND JOHN K. WEBBER, OF CALMAR, IOWA.

IMPROVEMENT IN SCREW-THREADING ATTACHMENTS TO BEADING-MACHINES.

Specification forming part of Letters Patent No. 182,491, dated September 19, 1876; application filed March 29, 1876.

*To all whom it may concern:*

Be it known that we, VALENTINE E. STRAYER and JOHN K. WEBBER, of Calmar, in the county of Winneshiek and State of Iowa, have invented certain new and useful Improvements in Attachments to Beading-Machines; and we do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

Our invention relates to attachments to the ordinary beading-machines, and is designed to turn screw-threads on sheet-pipe, so that the pipes may be screwed together. It may be attached to any beading-machine.

We are aware that machines are made to accomplish this purpose, but the cost is considerable, while the comparative cost of our invention is small.

Figure 1 is a perspective view of the common beading-machine, with our attachment. Fig. 2 is a side view of our attachment; and Fig. 3 is a vertical sectional view of the same.

M represents a beading-machine. A is a beaded wheel, and A' is a wheel grooved to correspond and engage with the bead-wheel A. B is a gage-nut, having two upward-extending prongs, and provided with a female screw, to engage with the male screw on the sleeve D. C C' are shafts of the beading-machine M. To the shafts C C' are attached the sleeves D D'. The beaded wheel A is fastened to the end of the sleeve D, and the grooved wheel A' is fastened to D'.

In order to turn a thread upon any sheet-metal pipe, we place the beaded-wheel sleeve on the shaft C, with the gage-nut B attached, the prongs of nut B being open and straddling C'. Place the grooved-wheel sleeve D' upon the upper shaft C', both sleeves being made fast to shafts C C'.

In order to turn a thread upon the pipe, first turn the crank until the gage-nut B is at the desired distance from the bead-wheel A. Then place the small end of the pipe over the beaded wheel A and against the gage-nut B. Turn the crank on the machine until the wheels A A' produce the desired raise of thread.

Now, it is obvious that when the crank of the machine is turned the gage-nut B must travel toward the bead-wheel, which produces the thread upon the small end of the pipe. Without moving the gage-nut, place the reverse end of the pipe against the gage-nut, holding it firmly, and turn the crank so as to cause the gage-nut to travel from the bead-wheel until the desired depth of thread is produced on the pipe. This finishes the making of the threads on both ends of the pipe.

Having now fully described our invention, what we claim, and desire to secure by Letters Patent, is—

1. The gage-nut B, provided with two upward-extending prongs, which embrace the shaft C', substantially as described, and for the purposes set forth.

2. The bead-wheel A and the grooved wheel A', in combination with the gage-nut B, providen with two upward-extending prongs straddling the shaft C', substantially as described, and for the purposes set forth.

In testimony that we claim the foregoing we have hereunto set our hands and seals this 18th day of March, 1876.

VALENTINE E. STRAYER. [L.S.]
JOHN K. WEBBER. [L.S.]

Witnesses:
JOHN ELLINGSON,
J. A. KLEIN.